United States Patent Office.

HUGH BURGESS, OF ROYER'S FORD, PENNSYLVANIA.

Letters Patent No. 95,317, dated September 28, 1869.

IMPROVED EXTRACT OF HOPS.

The Schedule referred to in these Letters Patent and making part of the same.

*To all whom it may concern:*

Be it known that I, HUGH BURGESS, of Royer's Ford, Montgomery county, Pennsylvania, have invented an Improved Hop-Extract; and I do hereby declare the following to be a full, clear, and exact description of the same.

The hops from which the extract is to be obtained are digested in purified bisulphide of carbon, (either alone, or with alcohol, ether, chloroform, or other suitable substance,) until the bitter aromatic or flavoring-principle of the hops is removed.

On the application of heat to the still or vessel containing the materials, the bisulphide of carbon is entirely driven off, leaving a resinous extract in the still.

Various modes may be employed for treating the hops with the bisulphide to obtain the extract; but I give the following process, as it has been found to be efficient in practice.

The hops are introduced into a suitable vessel, and are covered with bisulphide of carbon, which, in about an hour, is drawn off into a still. On the application of heat, the bisulphide is expelled from the still, and is then condensed and thrown again on to the hops, this operation being repeated until all or nearly all the flavoring-matter is extracted. By the aid of suitable appliances this process may be made automatic.

To collect the resinous extract in a convenient form for future use, unsized paper, or other bibulous substance, may be placed in the still, where it will absorb the material therein, the active principle of the extract being liberated from the absorbent substance when the latter is introduced into the water, "wort," or solution to be flavored.

I claim as my invention, and desire to secure by Letters Patent—

1. The new product or extract from hops, herein described.

2. Treating hops in the mode and with the material substantially as specified.

In testimony whereof, I have signed my name to this specification, in the presence of two subscribing witnesses.

HUGH BURGESS.

Witnesses:
CHARLES E. FOSTER,
E. H. BAILEY.